(12) United States Patent
Eriksson et al.

(10) Patent No.: US 8,855,874 B2
(45) Date of Patent: Oct. 7, 2014

(54) METHOD AND DEVICE FOR CONTROLLING A VEHICLE CRUISE CONTROL

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 293 days.

(21) Appl. No.: 13/140,465

(22) PCT Filed: Dec. 19, 2008

(86) PCT No.: PCT/SE2008/000736
§ 371 (c)(1),
(2), (4) Date: Aug. 24, 2011

(87) PCT Pub. No.: WO2010/071498
PCT Pub. Date: Jun. 24, 2010

(65) Prior Publication Data
US 2012/0101698 A1    Apr. 26, 2012

(51) Int. Cl.
*B60W 30/14* (2006.01)
*B60K 31/00* (2006.01)
*G01F 9/02* (2006.01)
*G01C 21/34* (2006.01)

(52) U.S. Cl.
CPC ...... *G01C 21/3469* (2013.01); *B60W 2720/103* (2013.01); *B60W 2550/402* (2013.01); *B60W 30/143* (2013.01)
USPC ............................... 701/53; 701/93; 701/123

(58) Field of Classification Search
None
See application file for complete search history.

(56) References Cited

U.S. PATENT DOCUMENTS

| 5,627,752 | A | 5/1997 | Buck et al. | |
|---|---|---|---|---|
| 7,925,426 | B2 * | 4/2011 | Koebler et al. | 701/123 |
| 2005/0055157 | A1 | 3/2005 | Scholl | |
| 2011/0251773 | A1 * | 10/2011 | Sahandiesfanjani et al. | 701/102 |
| 2011/0313647 | A1 * | 12/2011 | Koebler et al. | 701/123 |
| 2012/0209510 | A1 * | 8/2012 | Ikawa et al. | 701/423 |
| 2013/0041621 | A1 * | 2/2013 | Smith et al. | 702/142 |

FOREIGN PATENT DOCUMENTS

| DE | 19605458 C1 | 9/1997 |
|---|---|---|
| EP | 0752548 A2 | 1/1997 |
| GB | 2319635 A | 5/1998 |
| WO | 02092378 A1 | 11/2002 |

OTHER PUBLICATIONS

European Search Report (Aug. 21, 2012) for corresponding European App. EP 08 87 8973.
International Search Report for corresponding International App. PCT/SE2008/000736.
International Preliminary Report on Patentability for corresponding International App. PCT/SE2008/000736.

* cited by examiner

*Primary Examiner* — Mussa A Shaawat
(74) *Attorney, Agent, or Firm* — WRB-IP LLP

(57) ABSTRACT

A method and device are provided for controlling a vehicle cruise control in a vehicle, the method including registering a starting point and an end destination for a possible traveling route of the vehicle, registering a desired traveling time for the traveling route, calculating and setting limits for parameters of the cruise control in order to arrive at the end destination on the desired traveling time with as low fuel consumption as possible.

11 Claims, 2 Drawing Sheets

METHOD AND DEVICE FOR CONTROLLING A VEHICLE CRUISE CONTROL

BACKGROUND AND SUMMARY

The present invention relates to a method for controlling a cruise control. In particular, the invention will find its application in connection with automotive vehicles. The invention also relates to a device intended for such method for controlling a cruise control.

The present invention also relates to a computer program, computer program product and a storage medium for a computer, all to be used with a computer for executing said method.

A cruise control in a vehicle helps the driver to hold a set vehicle speed without the driver having to press an accelerator pedal. A control unit can be arranged to regulate propulsive power, from for example an engine and/or an electric motor, in order to hold said set speed. In alternative known solutions a control unit can be arranged to regulate both propulsive power and braking power of a vehicle. Thus, for example also auxiliary brakes and/or service brakes can be regulated by said control unit in order to maintain a set speed.

If such a vehicle is further equipped with an automatic transmission a transmission control unit will handle gear selection and gear shifting.

GB2319635 discloses a motor vehicle drive force controller, comprising navigation device with a GPS (Global Positioning System) antenna. A drive force characteristic can be throttle gain of an electronic throttle, the gear shift pattern of an automatic transmission, or the air/fuel ratio. A control system automatically controls engine parameters of the vehicle and gear selection in dependence of prevailing road condition obtained from said navigation device.

US20050055157 discloses a navigation system having means for determining a route with optimized fuel consumption. Said navigation system can determine a starting point and an end point of a possible travelling route of said vehicle and based on a desired travelling time a fuel consumption can be calculated and a cruise controller can be controlled in order to arrive at said end point within said desired travelling time.

Even though known solutions can be fairly optimized with regards to fuel consumption there is always an urge towards an even lower fuel consumption.

It is desirable to further reduce fuel consumption when a cruise control is activated in a vehicle.

The method according to an aspect of the invention is a method for controlling a vehicle cruise control in a vehicle comprising (including, but is not necessarily limited to) the steps of:

registering a starting point and an end destination for a possible traveling route of said vehicle;

registering a desired traveling time for said traveling route;

calculating and setting limits for parameters of said cruise control in order to arrive at said end destination on said desired traveling time with as low fuel consumption as possible;

Recalculating said limits as soon as an unexpected occurrence happens when traveling between said starting point and said end destination, and which occurrence affects vehicle average speed;

and in connection to said step of calculating and setting said limits and based on said desired traveling time, selecting a gear shifting pattern which is estimated to give lowest fuel consumption.

In one embodiment according to an aspect of the invention said limits for said parameters are one or several of:

a maximum vehicle acceleration limit;
a maximum vehicle retardation limit;
a maximum under speed in relation to a vehicle set speed;
a maximum over speed in relation to a vehicle set speed;
a maximum available engine torque;
regulatory limits for the cruise control;
a set speed;
limit for when to engage/disengage a free wheeling function.

In a further embodiment according to an aspect of the invention said limits are recalculated as soon as an unexpected occurrence happens when traveling between said starting point and said end destination, and which occurrence affects vehicle average speed.

In another embodiment according to an aspect of the invention and in connection to said step of calculating and setting said limits and based on said desired traveling time, said method is characterized in that selecting a gear shifting pattern which is estimated to give lowest fuel consumption.

In an embodiment according to an aspect of the invention, said method is further characterized in that selecting a new gear shifting pattern, which is estimated to give lowest fuel consumption, as soon as an unexpected occurrence happens when traveling between said starting point and said end destination, and which occurrence affects vehicle average speed.

In an embodiment according to an aspect of the invention, said method is further characterized in that in connection to said step of calculating and setting said limits and based on said desired traveling time, selecting between two or several possible routes a traveling route between said starting point and said end destination, which route is estimated to give lowest fuel consumption.

In a further embodiment according to the invention, said method is further characterized in that reevaluating said route selection as soon as an unexpected occurrence happens, which affects vehicle average speed, and basing said reevaluation on a current vehicle position as a starting point.

In an embodiment according to an aspect of the invention said method is further, characterized in that before said step of registering a desired traveling time, estimating and suggesting a first traveling time based on said starting point, said end destination and a vehicle average speed during said traveling route.

In an embodiment according to an aspect of the invention said method is further characterized in that during traveling between said starting point and said end destination continuously recalculating said limits with updated vehicle condition information.

According to another aspect of the invention, a device is provided defined as a vehicle cruise control that comprises (includes, but is not necessarily limited to) a control unit for controlling vehicle speed of a vehicle, a route identifying device and a cruise control driver interface. Said vehicle cruise control is characterized in that said control unit is arranged to perform all the steps of a method according to an aspect of the invention.

BRIEF DESCRIPTION OF THE DRAWING

The present invention will be described in greater detail below with reference to the accompanying drawings which, for the purpose of exemplification, show further preferred embodiments of the invention and also the technical background, and in which.

DETAILED DESCRIPTION

Figure 1:
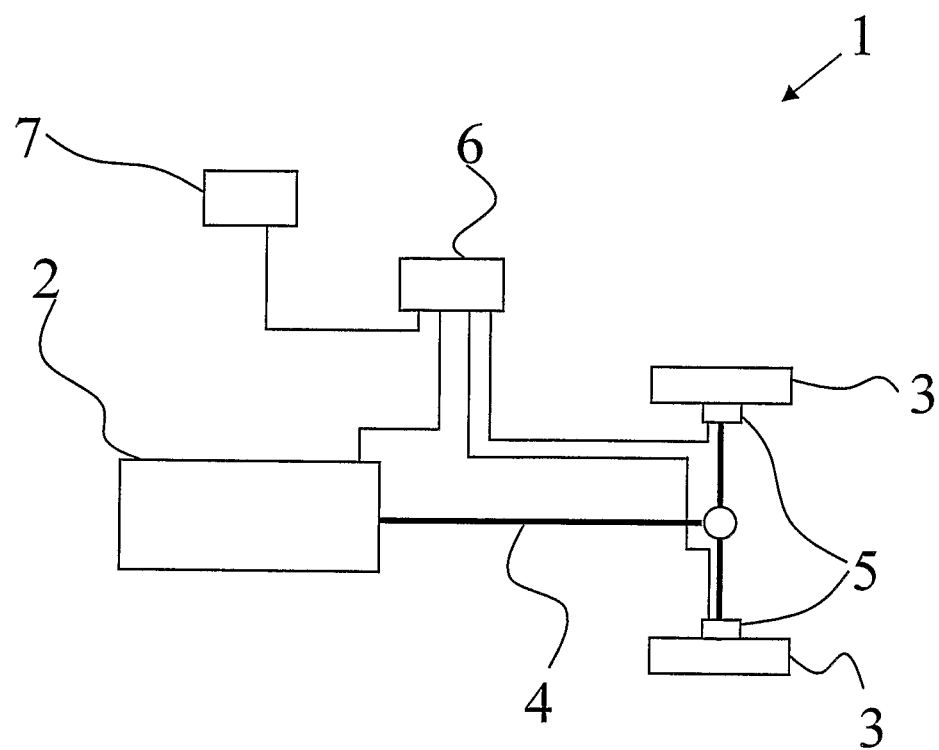
FIG. 1 diagrammatically shows a vehicle with a cruise control according to an embodiment of the invention.

FIG. 1 discloses a vehicle 1 comprising a propulsion unit 2, which can be a combustion engine, an electric motor/generator or a combination, i.e. a series hybrid electric vehicle or a parallel hybrid electric vehicle or a power split hybrid" electric vehicle. The propulsive power" is in the shown example transmitted to driven wheels 3 of the vehicle via a propeller shaft 4. A manual or automatic transmission can be arranged in said propulsion unit 2 in order to be able to select and engage different gear ratios between, for example, a combustion engine and said driven wheels 3. Service brakes 5 are arranged in connection to said driven wheels 3 for braking the vehicle. When a cruise control function of said vehicle is active said service brakes 5 can be controlled by a cruise control unit β, which cruise control unit in this shown example also is arranged to control said propulsion unit 2 and the components included therein. A driver of the vehicle can set, for example, a vehicle speed or other regulatory limits for the cruise control through a cruise control driver interface 7 connected to said cruise control unit 6. Said propulsion unit 2 can also comprise of one or several auxiliary brakes, for example an engine compression brake and a hydraulic or electric retarder. Of course said electric motor/generator can also be used as a brake by said cruise control unit.

In its simplest form said cruise control can comprise a controlling functionally where only propulsive power from, for example, a combustion engine or/and an electric motor is/are regulated in order to maintain a set vehicle speed. In the most advanced embodiment said cruise control unit can be arranged to control service brakes, auxiliary brakes and propulsion units, or other functions in the vehicle that regulates vehicle speed. Embodiments between the mentioned extreme embodiments are also possible.

Propulsive power can also be transmitted to other not shown driven wheels of said vehicle. Propulsive power can be transmitted by other means than a propeller shaft, such as for example electric wires or hydraulic arrangements.

Said service brakes can also be arranged to brake other not shown driven or not driven wheels.

According to the invention said cruise control unit 6 is according to one embodiment programmed to perform the steps of:
  registering a starting point and an end destination for a possible traveling route of said vehicle;
  registering a desired traveling time for said traveling route;
  calculating and setting limits for parameters of said cruise control in order to arrive at said end destination on said desired traveling time with as low fuel consumption as possible.

Depending on the desired traveling time for said possible traveling route the cruise control unit is arranged to calculate limits for said parameters. The advantage is that said parameters will always be optimized for a present possible traveling route and for said desired traveling time for said route. The vehicle will be estimated to arrive at the end destination on time and with as low fuel consumption as possible. According to a further embodiment of the invention said parameters can be one or several of:
  a maximum vehicle acceleration limit;
  a maximum vehicle retardation limit;
  a maximum under speed in relation to a vehicle set speed;
  a maximum over speed in relation to a vehicle set speed;
  a maximum available engine torque;—regulatory limits for the cruise control;
  a set speed;
  limit for when to engage/disengage a free wheeling function.

Depending on the desired traveling time for said possible traveling route the cruise control unit is arranged to calculate and select a maximum allowable vehicle acceleration which is estimated to allow the vehicle to arrive at the end destination on time with the lowest possible fuel consumption. A corresponding calculation can be performed for the other mentioned parameters. For example if said desired traveling time is relatively long a lower set speed can be selected or suggested by said cruise control unit 6. Such a lower set speed can be suggested and displayed to the driver in said cruise control driver interface 7. The driver can then approve the suggested set speed or select another set speed.

According to the same principals; a maximum vehicle retardation limit, a maximum under speed in relation to a vehicle set speed, a maximum over speed in relation to a vehicle set speed and a maximum available engine torque can be calculated and selected. All, some or none of said parameters can be suggested and displayed to the driver. Thus, the driver can choose if he wants to adopt the suggested parameters. If a parameter is not displayed to the driver the cruise control unit 6 just simply adopts the selected value of a specific parameter and regulates accordingly.

Regulatory limits for said cruise control can be an adjustable gain factor or other parameters that affect the aggressiveness of the cruise control unit β (regulator).

Depending on the desired traveling time for said possible traveling route the cruise control unit 6 can also be arranged to calculate and suggest a set speed which is estimated to allow the vehicle to arrive at the end destination on time with the lowest possible fuel consumption. When calculating a set speed said cruise control unit can be arranged to provide information about speed limits along said traveling route, in order not to exceed maximum allowable speed limits. Said cruise control unit can also be programmed to not suggest a too low vehicle speed, which if applied, would risk causing traffic jam due to a slow going vehicle.

WO02/092378 discloses a freewheel function in an automated stage geared transmission. A freewheel function can be obtained by putting a splitter gear disposed in a transmission into its neutral position when an accelerator pedal disposed in the vehicle is located within a predetermined swivel angle range, which starts at a distance from the rest position of the pedal and extends over a slight angle within the total swivel angle of the pedal. When the driver wishes to change the driving condition from driving engine to allowing the vehicle to freewheel without engine braking, he lets up the gas pedal, so that it reaches the predetermined range when the drive from the engine is broken. If engine braking is required, he further releases the gas pedal, either fully or, in any event, to the point where it passes through the predetermined range within which disengagement occurs. With freewheeling technology according to WO02/092378, the increase in speed of the vehicle when freewheeling can sometimes become excessive. In this case, the driver of the vehicle reduces the vehicle speed by activating the service brake and/or auxiliary brake of the vehicle. This free wheeling functionality can also be performed by a cruise control, such as the one explained through FIG. 1. Thus, said cruise control unit can according to the invention and the above mentioned "limit for when to engage/disengage a free wheeling function" be programmed to adjust for example; speed limits, road inclination limits, retardation and acceleration limits connected to the engagement/disengagement control of said free wheeling with regards to the desired traveling time and the possible traveling route. For example if there is a lot traveling time available the cruise control unit can be programmed to free wheel to a lower under speed (compared to a set speed), compared to if the desired traveling time is shorter. Thus, adapting a free wheeling functionality (if available in the vehicle) can further extend the possibility to save fuel when the desired traveling time is relatively long.

If limits are calculated and selected for two or several of the mentioned parameters said calculation can be perform with regards to a weighing between the different two or several parameters. For example those parameters that affect the fuel consumption the most can be adjusted last or not at all if the desired traveling time is relatively short. On the other hand if there is a lot of time available to take the vehicle from the starting point to the end destination, then there is perhaps space for limit adjustments of all available parameters that affect the fuel consumption.

In a further embodiment of the invention said cruise control unit can be programmed to recalculate said limits of the parameters as soon as an unexpected occurrence happens when traveling between said starting point and said end destination, and which occurrence affects vehicle average speed. If the average vehicle speed is lowered, due to for example an unexpected vehicle stop, said cruise control unit will recalculate said limits in order to arrive the end destination at the estimated traveling time.

If said vehicle comprises an automatic transmission for different gear ratio selection between said propulsion unit and said driven wheels said cruise control unit can according to a further embodiment of the invention be programmed to select a gear shifting pattern which is estimated to give the lowest fuel consumption during said traveling route. The estimation of such a gear shifting pattern is performed in connection to said step of calculating and setting said limits. Said estimation is based on said desired traveling time. In this way also a transmission in the vehicle can be adjusted to said traveling route and said desired traveling time. In a further embodiment of the invention said cruise control unit can be programmed to perform a new selection of a gear shifting pattern, which is estimated to give lowest fuel consumption, as soon as an unexpected occurrence happens when traveling between said starting point and said end destination, and which occurrence affects vehicle average speed. If the average vehicle speed is lowered, due to for example an unexpected vehicle stop, said cruise control unit will estimate and select an adjusted gear shifting pattern (compared to the former adopted gear shifting pattern) in order to be able to arrive the end destination at the estimated traveling time. For example, engine speed, at which the transmission will upshift, can be increased to a higher engine rotational speed if a lot of time has been lost during said vehicle stop.

In a further embodiment of said invention and in connection to said step of calculating and setting said limits and based on said desired traveling time, said cruise control unit can be programmed to select between two or several possible routes a traveling route between said starting point and said end destination, which route is estimated to give lowest fuel consumption. For example if there are two possible routes to reach the end destination at approximately same time said cruise control unit can be programmed to select the one that is estimated to give the lowest fuel consumption. The cruise control unit can be programmed to consider topography of the possible routes and/or if available traffic intensity and/or number of traffic lights et cetera. If the traveling time is relatively short then of course the traveling route that is estimated to be the fastest one will be selected.

In a further embodiment of the invention said cruise control unit can be programmed to reevaluate said route selection as soon as an unexpected occurrence happens, which affects vehicle average speed, and basing said reevaluation on a current vehicle position as a starting point. Of course if there is no other possible route to be selected there will not be a reevaluation of the route selection.

In all of the former mentioned embodiments said cruise control unit can be programmed to estimate and suggest a first traveling time based on said starting point, said end destination and a vehicle average speed during said traveling route. This can be done before said step of registering a desired traveling time. This suggested first traveling time can be presented for the driver via said cruise control driver interface 7 and the driver can choose to adopt the suggested first traveling time or reject and adjust it.

In another embodiment of the invention said cruise control unit can be programmed to continuously recalculate said parameter limits with updated vehicle condition information during traveling between said starting point and said end destination.

Figure 2:
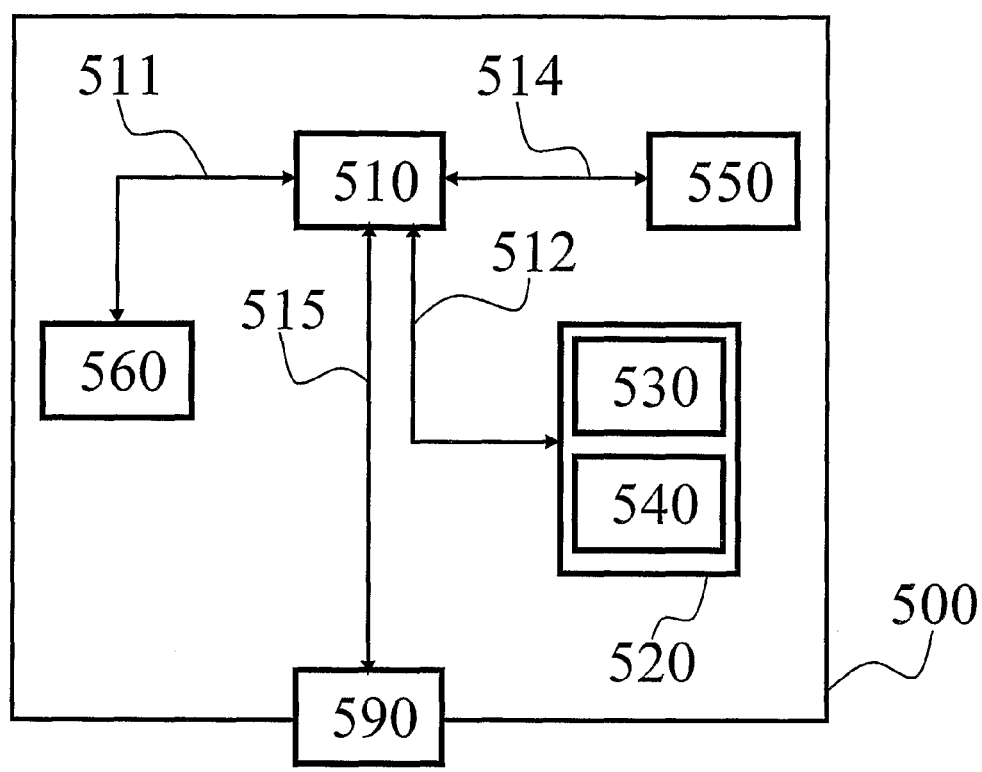
FIG. 2 shows the invention applied on a computer arrangement.

FIG. 2 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the cruise control unit β. The data-processing unit 510 can comprise, for example, a microcomputer.

The memory 520 also has a second memory part 540, in which a program for controlling the target gear selection function according to the invention is stored. In an alternative embodiment, the program for controlling the target gear selection function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for controlling a vehicle cruise control in a vehicle, comprising registering a starting point and an end destination for a possible traveling route of the vehicle;

registering a desired traveling time for the traveling route;

using a computer, calculating and setting limits for parameters of the cruise control in order to arrive at the end destination on the desired traveling time with as low fuel consumption as possible, recalculating the limits as soon as an unexpected occurrence happens when traveling between the starting point and the end destination, and which occurrence affects vehicle average speed in connection to the step of calculating and setting the limits and based on the desired traveling time;

in connection to the step of calculating and setting the limits and based on the desired traveling time, selecting a gear shifting pattern which is estimated to give lowest fuel consumption; and controlling the vehicle to select gears according to the selected gear shifting pattern.

2. Method as claimed in claim 1, wherein the limits for the parameters are one or several of:

a maximum vehicle acceleration limit;

a maximum vehicle retardation limit;

a maximum under speed in relation to a vehicle set speed;

a maximum over speed in relation to a vehicle set speed;

a maximum available engine torque;

regulatory limits for the cruise control;

a set speed;

limit for when to engage/disengage a free wheeling function.

3. Method as claimed in claim 2, further wherein selecting a new gear shifting pattern, which is estimated to give lowest fuel consumption, as soon as an unexpected occurrence happens when traveling between the starting point and the end destination, and which occurrence affects vehicle average speed.

4. Method as claimed in claim 1, comprising, in connection to the step of calculating and setting the limits and based on the desired traveling time, selecting between two or several possible routes a traveling route between the starting point and the end destination, which route is estimated to give lowest fuel consumption.

5. Method as claimed in claim 4, comprising reevaluating the route selection as soon as an unexpected occurrence happens, which affects vehicle average speed, and basing the reevaluation on a current vehicle position as a starting point.

6. Method as claimed in claim 1, comprising, before the step of registering a desired traveling time estimating and suggesting a first traveling time based on the starting point, the end destination and a vehicle average speed during the traveling route.

7. Method as claimed in claim 1, further comprising during traveling between the starting point and the end destination continuously recalculating the limits with updated vehicle condition information.

8. A vehicle cruise control comprising a control unit for controlling vehicle speed of a vehicle, a route identifying device and a cruise control driver interface, wherein the control unit is arranged to perform a method for controlling a vehicle cruise control in a vehicle comprising, the method comprising:

registering a starting point and an end destination for a possible traveling route of the vehicle;

registering, a desired traveling time for the traveling route;

using a computer, calculating and setting limits for parameters of the cruise control in order to arrive at the end destination on the desired traveling time with as low fuel consumption as possible, recalculating, the limits as soon as an unexpected occurrence happens when traveling between the starting point and the end destination, and which occurrence affects vehicle average speed in connection to the step of calculating and setting, the limits and based on the desired traveling, time; and in connection to the step of calculating and setting the limits and based on the desired traveling time, selecting a gear shifting, pattern which is estimated to give lowest fuel consumption.

9. A computer comprising program code configured to perform a method for controlling a vehicle cruise control in a vehicle comprising, the method comprising:

registering a starting point and an end destination for a possible traveling route of the vehicle;

registering a desired traveling time for the traveling route;

using a computer, calculating and setting limits for parameters of the cruise control in order to arrive at the end destination on the desired traveling time with as low fuel consumption as possible, recalculating the limits as soon as an unexpected occurrence happens when traveling between the starting point and the end destination, and which occurrence affects vehicle average speed in connection to the step of calculating and setting the limits and based on the desired traveling time; and in connection to the step of calculating and setting the limits and based on the desired traveling time, selecting a gear shifting pattern which is estimated to give lowest fuel consumption.

10. A computer program product on a non-transitory medium comprising program code for performing a method for controlling a vehicle cruise control, in a vehicle comprising: the method comprising:

registering a starting point and an end destination for a possible traveling route of the vehicle;

registering a desired traveling time for the traveling route;

using a computer, calculating and setting limits for parameters of the cruise control in order to arrive at the end destination on the desired traveling time with as low fuel consumption as possible, recalculating the limits as soon as an unexpected occurrence happens when traveling between the starting point and the end destination, and which occurrence affects vehicle average speed in connection to the step of calculating and setting the limits and based on the desired traveling time; and in connection to the step of calculating and setting the limits and based on the desired traveling time, selecting a gear shifting pattern which is estimated to give lowest fuel consumption.

11. A non-transitory computer memory or a non-transitory, nonvolatile data storage medium, for use in a computing environment, the memory comprising a computer readable program code to perform a method for controlling a vehicle cruise control in a vehicle comprising, the method comprising:

registering a starting point and an end destination for a possible traveling route of the vehicle;

registering a desired traveling time for the traveling route;

using a computer, calculating and setting limits for parameters of the cruise control in order to arrive at the end destination on the desired traveling time with as low fuel consumption as possible, recalculating the limits as soon as an unexpected occurrence happens when traveling between the starting point and the end destination, and which occurrence affects vehicle average speed in connection to the step of calculating and setting the limits and based on the desired traveling time; and in connection to the step of calculating and setting the limits and based on the desired traveling time, selecting a gear shifting pattern which is estimated to give lowest fuel consumption.

\* \* \* \* \*